UNITED STATES PATENT OFFICE.

WALTER S. GATES AND HERBERT H. DOW, OF MIDLAND, MICHIGAN, ASSIGNORS, BY MESNE ASSIGNMENTS, TO THE ONTARIO NICKEL COMPANY, LIMITED, OF WORTHINGTON, CANADA, A CORPORATION OF CANADA.

PROCESS OF RENDERING SOLUBLE IN WATER THE NICKEL AND COPPER CONTAINED IN SULFID ORES AND MATTES.

No. 874,496.  Specification of Letters Patent.  Patented Dec. 24, 1907.

Application filed March 22, 1906. Serial No. 307,379.

*To all whom it may concern:*

Be it known that we, WALTER S. GATES and HERBERT H. DOW, citizens of the United States, residents of Midland, county of Midland, and State of Michigan, have invented a new and useful Improvement in Processes of Rendering Soluble in Water the Nickel and Copper which are Contained in Sulfid Ores and Mattes, of which the following is a specification, the principle of the invention being herein explained and the best mode in which we have contemplated applying that principle, so as to distinguish it from other inventions.

Our invention relates to a new and useful process of rendering soluble the nickel and copper contained in sulfid ores and mattes, for instance, the usual pyrrhotite ores.

Our invention is designed to precede in operation and coöperate with our improved process of separating metals in solution, described in our application for U. S. Letters Patent, Serial No. 300,728, filed Feb'y 12, 1906, the steps of this process being adapted to bring the valuable metals into a condition where they may be acted upon by the process described and claimed in the above-entitled application.

Our invention consists in steps hereinafter fully described and specifically set forth in the claims.

The following description sets forth in detail one mode of carrying out the invention, such disclosed mode constituting but one of various ways in which the principle of the invention may be used.

The first step in our improved process is to crush and grind the ore, and then mix the same with salt, either sodium chlorid or the chlorids of the alkaline earth metals, or ferric chlorid, the chlorin and hydrochloric acid furnished by such chlorid treatment being a great help in the subsequent roasting of the combination of copper, nickel and iron sulfids. We then roast the mixture in any suitable mechanical calciner at a temperature not exceeding a moderate red heat, since a very high temperature would cause the nickel and copper to form oxids which are insoluble in water or a haloid solution; whereas, a moderate roasting temperature produces largely normal and basic sulfates and chlorids of copper and nickel which are soluble in the above-named reagents. Furthermore, a moderate roasting temperature does not decompose the sulfates and chlorids of nickel and copper which have been obtained at any time from a previous stage of the roast. And, again, a moderate roasting temperature converts a large amount of the iron present in the ore directly to ferric oxid, and, also, any normal and basic iron salts, such as $Fe_2(SO_4)3$ and $Fe_2(SO_4)3.Fe_2O_3$ which are present at any time from a previous stage of the roast are decomposed to ferric oxid, which is insoluble in the above-named reagents.

At the first stages of the roasting step, the gases given off are $SO_2$, $SO_3$ and HCl, and any iron which is soluble is in the ferrous state; in the later stages of the roasting steps the gases given off are $Cl_2$ in excess, $SO_3$, HCl, and the iron is in a ferric condition. The roasting step is not discontinued when the chlorin fumes first appear, but is continued to advantage for some time after such appearance, in order to convert as much of the iron as possible to the condition in which it is insoluble in water, and in halogens. We find that the amount of chlorid necessary is from 10 to 15% of the weight of the ore. We aim to oxidize the bulk of the sulfur in the ore, the reason for which will be fully explained later, and the length of time required to accomplish this is dependent upon the fineness of the ore and the frequency with which a fresh surface is exposed to the oxidizing conditions. The mixed acids from the roasting step may be collected if desired in any desirable way. Roasting under the conditions above enumerated will render the following proportions, within wide limits, of the total of the different metals present soluble in water, viz:

Iron ----- about 1 to 4%
Copper --- "    50 to 75%
Nickel --- "    20 to 40%

The next step is to lixiviate the roasted ore with water in order to remove these soluble salts of iron, copper and nickel in a solution, which is faintly acid. This extraction can be effected in any suitable leaching vats with false bottoms. We thus recover a portion of the values contained in the sulfid ores or mattes, and the second part of our process is to treat the residues from the water extraction with a dilute solution of free halogen in order that we may render soluble a great part of the remaining values not obtained by the water extraction. We have discovered that a considerable part of the nickel and copper remaining insoluble in water after the roasting step is in such condition as to be easily attacked and dissolved by free halogens even in dilute solutions, without at the same time dissolving large amounts of iron. This is true if substantially all the sulfur in the ore has been oxidized during the roasting step; otherwise, any sulfid remaining uses up a large amount of free halogen in becoming oxidized, and thus gets into solution a large amount of iron since the latter predominated in the original sulfid; and, furthermore, there is an additional loss of efficiency in the halogen treatment, due to the subsequent dissolving by the halogen of the sulfur set free by the action of the halogen on the sulfid, and such action of the halogen upon the sulfid produces a large amount of sulfate which must later be removed, in order that the insoluble anodes in the cell used for setting free the halogen during the following step may not be subjected to its bad effect.

Of the halogens, we have found that bromin acts more rapidly than chlorin, and also dissolves the nickel and copper more completely, and the effect of this more efficient action of bromin can be easily attained by adding a little bromid to the brine solution containing the free chlorin, thus causing the free halogen existing at any time to be bromin.

Our improved method of treating the ore residue with free halogen is to electrolyze a brine, preferably containing a trace of bromid, in a suitable cell, preferably without a diaphragm, and then bring this brine, now containing free halogen, into contact with the ore residue, whereby the free halogen is taken up by the ore with the formation of soluble haloids of copper and nickel. This brine, now deprived of a large part of its free halogen and containing in its place the soluble halogen salts of copper and nickel, is removed from the ore and again passed through the cell, in which it is again electrolyzed, with the result that at the positive pole the halogen is again set free, and at the negative pole the corresponding amount of valuable metals is precipitated as hydrates according to the following reactions:

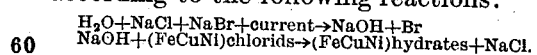

The proportion of salt and the voltage used could be so adjusted that the metals would be deposited at the negative pole in the metallic state, but there would also be thrown down by this neutral solution considerable basic iron precipitate, containing copper and nickel, which we have found to be an undesirable form for the purposes of our process. The brine is a convenient medium in which to create and carry the free halogen, and by which to leach the ore for the solvent action of the halogen. Furthermore, it has the advantage of a low resistance to the current in the cell. Any approved form and grouping of apparatus for accomplishing the above-described halogen treatment may be utilized, and we find it convenient and preferable to use as leaching vats the same ones in which the ore is lixiviated with water, so that the ore need not be moved before the halogen treatment, these vats being preferably made of wood coated with tar or asphalt to prevent their destruction by the free halogen. The cell may be constructed of the same material. These vats, as mentioned above, are provided with a false bottom and connected with two conduits to a cell adapted to contain the brine, and having insoluble electrodes, preferably of carbon. Circulation from the cell to the vat and vice versa may be effected in any suitable manner. The bromid brine enters the cell and is electrolyzed during its passage therethrough to the point where a small proportion of halogen is set free; the brine then passes to the ore in the vat, while passing through which the free bromin in the brine is taken up in dissolving the copper and nickel remaining in the ore residue, producing soluble bromids of such metals in the place of the free bromin. The brine, thus partly or completely deprived of its free bromin, is then returned to the cell, carrying with it the soluble bromids. Then it is again electrolyzed to the extent of freeing the bromin again from its combination with the valuable metals, said metals being deposited in a layer about the cathode in the form of hydrates, the brine with its free bromin again being returned to the vat to take up further values from the ore residue. By means of this continuous circulation the percentage of free halogens is kept low, which provides a good ampere efficiency, and, furthermore, there are not dissolved from the ore large amounts of substances which have no value, or substances which might present a positive disadvantage by their presence in the solution, such as iron and aluminium, and sulfate formed by the action of halogen on the sulfur set free by the halogen action upon imperfectly roasted cores of ore particles. Furthermore, by this continuous circulation, the same bromin acts repeatedly with slight loss and the same brine is used repeatedly. We do not thus secure pure hydrates in the cell, but by this treatment aim merely to obtain the values from the ore residues, and deposit them in the cell as mixed hydrates. This accumulation of mixed hyates in the cell is periodically washed out and mixed with the original water solution obtained by the lixiviation after the roasting which mixture now contains most of the copper and nickel of the ore, together with a small percentage of the iron; and the iron content of the original water solution causes it to take up the copper and nickel in the mixed hydrates, according to the method outlined in our above mentioned application No. 300728. The halogen treatment is continued with a vat of ore so long as economic, and then that ore is washed and discarded.

The halogen treatment could follow the roasting step without the intermediate lixiviating with water, if it were so desired, but there is a serious disadvantage in doing this, in that the first water solution contains comparatively much sulfate, which makes it impracticable to use carbon electrodes.

In all the above treatments we have discovered that cobalt acts in the same manner as nickel and in every way is an equivalent of the latter.

We are well aware that methods have been used in which some steps similar to ours are disclosed; for instance, processes for copper ores, in which the ore is roasted with salt, giving 75% of copper soluble in hot water and 25% soluble in hot mixed acid derived from the roasting steps; also processes for nickel in which the ore is roasted with salt, giving some nickel and copper soluble in hot water; but we are not aware that such roasting and leaching steps have been combined with treatments which we have hereinbefore described, namely, the combination of the recovery of part of the values by roasting and lixiviating, and the recovery of further values by treatment with a free halogen, simultaneous separation of metallic hydrates, and the addition of such hydrates to the solution derived from the lixiviation of the roasted ore whereby practically all the copper and nickel in the ore are obtained in forms most suitable for treatment according to our process outlined in the above-mentioned application No. 300728. We wish to point out that there is a great advantage in the above treatment over other processes in the matter of handling the corrosive acid and copper solutions in the cold.

Having thus described our invention in detail, that which we particularly point out and distinctly claim, is:

1. In a process of rendering soluble in water the nickel and copper which are contained in sulfid ores and mattes, the steps which consist, in roasting the ore; and, then, treating the same with a haloid solution containing free halogen.

2. In a process of rendering soluble in water the nickel and copper which are contained in sulfid ores and mattes, the steps which consist, in roasting the ore; and, then, treating the same with a haloid solution containing free bromin.

3. In a process of rendering soluble in water the nickel and copper which are contained in sulfid ores and mattes, the steps which consist, in roasting the ore; lixiviating with water; and, then, treating the residue with a haloid solution containing free halogen.

4. In a process of rendering soluble in water the nickel and copper which are contained in sulfid ores and mattes, the steps which consist, in mixing the ore with a chlorid; roasting said mixture; and, then, treating the same with a haloid solution containing free halogen.

5. In a process of rendering soluble in water the nickel and copper which are contained in sulfid ores and mattes, the steps which consist, in mixing the ore with a chlorid; roasting said mixture; and, then, treating the same with a haloid solution containing free bromin.

6. In a process of rendering soluble in water the nickel and copper which are contained in sulfid ores and mattes, the steps which consist, in mixing the ore with a chlorid; roasting said mixture; lixiviating with water; and, then, treating the residue with free halogen.

7. In a process of rendering soluble in water the nickel and copper which are contained in sulfid ores and mattes, the steps which consist, in mixing the ore with a chlorid; roasting said mixture; lixiviating with water; and, then, treating the residue with free bromin.

8. In a process of rendering soluble in water the nickel and copper which are contained in sulfid ores and mattes, the steps which consist, in roasting the ore; lixiviating; treating the residue with a brine solution containing free halogen, thereby obtaining haloids; and, then, electrolyzing said brine, thereby setting halogen free and simultaneously creating insoluble products.

9. In a process of rendering soluble in water the nickel and copper which are contained in sulfid ores and mattes, the steps which consist, in roasting the ore; lixiviating; treating the residue with a brine solution containing free bromin, thereby obtaining bromids; and, then, electrolyzing said brine, thereby setting bromin free and simultaneously creating insoluble products.

10. In a process of rendering soluble in water the nickel and copper which are contained in sulfid ores and mattes, the steps which consist, in mixing the ore with a chlorid; roasting said mixture; lixiviating with water; treating the residue with a brine solution containing free halogen, thereby obtaining haloids; and, then, electrolyzing said brine, thereby setting halogen free and simultaneously creating insoluble products.

11. In a process of rendering soluble in water the nickel and copper which are contained in sulfid ores and mattes, the steps which consist, in mixing the ore with a chlorid; roasting said mixture; lixiviating with water; treating the residue with free halogen, thereby obtaining haloids; setting free the halogen from the latter and simultaneously creating insoluble products in a cell by electrolyzing a brine containing said haloids; and, then, dissolving such insoluble products.

12. In a process of rendering soluble in water the nickel and copper which are contained in sulfid ores and mattes, the steps which consist, in roasting the ore; lixiviating; treating the residue with a brine solution containing free halogen, thereby obtaining haloids; electrolyzing said brine, thereby setting halogen free and simultaneously creating insoluble products; and, then, causing the halogen thus set free to act upon more residues from the lixiviating treatment.

13. In a process of rendering soluble in water the nickel and copper which are contained in sulfid ores and mattes, the steps which consist, in roasting the ore; lixiviating; treating the residue with a brine solution containing free bromin, thereby obtaining bromids; electrolyzing said brine, thereby setting bromin free and simultaneously creating insoluble products; and, then, causing the bromin thus set free to act upon more residues from the lixiviating treatment.

14. In a process of rendering soluble in water the nickel and copper which are contained in sulfid ores and mattes, the steps which consist, in mixing the ore with a chlorid; roasting said mixture; lixiviating with water; treating the residue with a brine solution containing free halogen, thereby obtaining haloids; electrolyzing said brine, thereby setting halogen free and simultaneously creating insoluble products; and, then, causing the halogen thus set free to act upon more residues from the lixiviating treatment.

15. In a process of rendering soluble in water the nickel and copper which are contained in sulfid ores and mattes, the steps which consist, in mixing the ore with a chlorid; roasting said mixture; lixiviating with water; treating the residue with free halogen, thereby obtaining haloids; setting free the halogen from the latter and simultaneously creating insoluble valuable products in a cell by electrolyzing a brine containing said haloids; dissolving such insoluble products; and causing the halogen set free as above to act upon more residues from the lixiviating treatment.

16. In a process of rendering soluble in water the nickel and copper which are contained in sulfid ores and mattes, the steps which consist, in recovering part of the values by roasting and lixiviating; and, then, recovering further values by electrolyzing in a cell a brine containing bromids, causing the bromin that is set free by said electrolyzing step to act upon the residues of said lixiviating step, thereby forming more bromids, and, simultaneously, creating insoluble products from the metals in those bromids from which the bromin has been freed.

17. In a process of rendering soluble in water the nickel and copper which are contained in sulfid ores and mattes, the steps which consist, in recovering part of the values by roasting and lixiviating; and, then, recovering further values by electrolyzing in a cell a halogen brine containing bromids formed by the action of free bromin upon the residues from a lixiviating treatment; causing the bromin that is set free by said electrolyzing step to act upon other portions of such residues to form more bromids, and the metals in said bromids from which the bromin has been freed to form insoluble products in the cell.

18. In a process of rendering soluble in water the nickel and copper which are contained in sulfid ores and mattes, the steps which consist, in recovering part of the values by roasting and lixiviating; and, then, recovering further values by forming haloids of the valuable metals contained in the residue from such lixiviating step; continuously electrolyzing in a cell a brine containing said haloids, thereby setting halogen free and forming insoluble products of the values in said haloids, and causing the halogen thus set free to act upon other portions of the residue from the lixiviating step.

19. In a process of rendering soluble in water the nickel and copper which are contained in sulfid ores and mattes, the steps which consist, in recovering part of the values by roasting and lixiviating; and, then, recovering further values by forming haloids with the valuable metals contained in the residues from such lixiviating treatment; continuously electrolyzing in a cell a brine containing said haloids, thereby setting halogen free and causing the values in said haloids to form insoluble products in the cell, causing the halogen thus set free to act upon other portions of the residue from such lixiviating step, and dissolving said insoluble products.

20. In a process of rendering soluble in water the nickel and copper which are contained in sulfid ores and mattes, the steps which consist, in recovering a portion of the values by grinding the ore; mixing the same with a chlorid; roasting the mixture and lixiviating with water; and, then, recovering further values by treating the residue with free bromin; continuously electrolyzing in a cell a halogen brine containing bromids of the valuable metals formed by such free bromin treatment, thereby setting bromin free to act upon other portions of such residues and creating insoluble products in the cell of the valuable metals contained in said bromids from which the bromin has been freed; dissolving such insoluble products; and recovering the values from such solution.

21. In a process of rendering soluble in water the nickel and copper which are contained in sulfid ores and mattes, the steps which consist, in roasting the ore; lixiviating; treating the residue with free halogen; and, then, electrolyzing in a cell the resultant halogen salts with a simultaneous precipitation of metallic constituents in insoluble form, and the liberation of free halogen.

22. In a process of rendering soluble in water the nickel and copper which are contained in sulfid ores and mattes, the steps which consist, in mixing the ore with a chlorid; roasting the mixture; lixiviating; treating the residue with free halogen; electrolyzing the resultant halgen soalts in a cell with a simultaneous precipitation of the metallic constituents in insoluble form and the liberation of free halogen; and, then, dissolving such insoluble products.

23. In a process of rendering soluble in water the nickel and copper which are contained in sulfid ores and mattes, the steps which consist, in mixing the ore with a chlorid; roasting the mixture; treating the same with free bromin; continuously electrolyzing in a cell a halogen brine containing bromids of iron, copper and nickel formed by such free bromin treatment, thereby setting bromin free to act upon other portions of such roasted mixture and creating insoluble products of iron, copper and nickel in the cell; and, then, dissolving such insoluble products.

24. In a process of rendering soluble in water the nickel which is contained in sulfid ores and mattes, the steps which consist, in mixing the ore with a chlorid; roasting the mixture; treating the same with free bromin, thereby obtaining nickel bromid; and, then, setting free the bromin from said bromid and simultaneously creating nickel hydrate in a cell by electrolyzing a halogen brine containing said nickel bromid.

25. In a process of rendering soluble in water the nickel and copper which are contained in sulfid ores and mattes, the steps which consist, in recovering a portion of the values by roasting and lixiviating; and, then, recovering further portions of the valuable metals by converting them from the residue into haloids and then into hydrates; and, then, adding such hydrates to the original water solution obtained by said lixiviating step.

26. In a process of rendering soluble in water the nickel which is contained in sulfid ores and mattes, the steps which consist, in mixing the ore with a chlorid; roasting said mixture; lixiviating with water; treating the residue with free bromin, thereby obtaining nickel bromid; and, then, setting free the bromin from said bromid and simultaneously creating nickel hydrate in a cell by electrolyzing a halogen brine containing said nickel bromid.

27. In a process of rendering soluble in water the nickel and copper which are contained in sulfid ores and mattes, the steps which consists, in mixing the ore with a chlorid; roasting the mixture; lixiviating; treating the residue with free halogen; electrolyzing the resultant salts of nickel, copper and iron in a cell with the simultaneous precipitation of the nickel, copper and iron and the liberation of free halogen.

28. In a process of rendering soluble in water the nickel and copper which are contained in sulfid ores and mattes, the steps which consist, in mixing the ore with a chlorid; roasting the mixture; lixiviating; treating the residue with free bromin; electrolyzing the resultant bromids in a cell with the simultaneous precipitation of the nickel, copper and iron as hydrates and the liberation of free bromin; and, then, adding such hydrates to the original water solution obtained by said lixiviating step.

29. In a process of rendering soluble in water the nickel and copper which are contained in sulfid ores and mattes, the steps which consist, in recovering a portion of the values by roasting and lixiviating; and, then, recovering further portions of the valuable metals by converting them into bromids, electrolyzing in a cell a halogen brine containing such bromids, with the formation of hydrates of the valuable metals; and, then, dissolving the hydrates resulting from said electrolyzing treatment.

30. In a process of rendering soluble in water the nickel which is contained in sulfid ores and mattes, the steps which consist, in recovering a portion of the values by roasting and lixiviating; and, then, recovering further values by treating the residue with a brine solution containing free halogen; and electrolyzing the resultant halogen salts of nickel to form nickel hydrate.

31. In a process of rendering soluble in water the nickel which is contained in sulfid ores and mattes, the steps which consist, in mixing the ore with a chlorid; roasting the mixture; lixiviating; treating the residue with a brine solution containing free bromin; and electrolyzing the resultant bromin salts of nickel with the formation of nickel hydrate and the liberation of free bromin.

32. In a process of rendering soluble in water the nickel and copper which are contained in sulfid ores and mattes, the steps which consist, in disintegrating the ore; mixing the same with sodium chlorid; roasting the mixture; lixiviating; treating the residue with free bromine created by electrolyzing in a cell a halogen brine containing bromids of the valuable metals, thus forming insoluble products in the cell; dissolving such insoluble products; and recovering the values from such solution.

Signed by us, this 14 day of March 1906.

WALTER S. GATES.
HERBERT H. DOW.

Attested by:—
G. L. CAMP,
C. M. YOUNG.